No. 738,821. PATENTED SEPT. 15, 1903.
F. H. LINDNER.
PRINTING PRESS.
APPLICATION FILED FEB. 5, 1902. RENEWED JAN. 22, 1903.
NO MODEL. 13 SHEETS—SHEET 2.
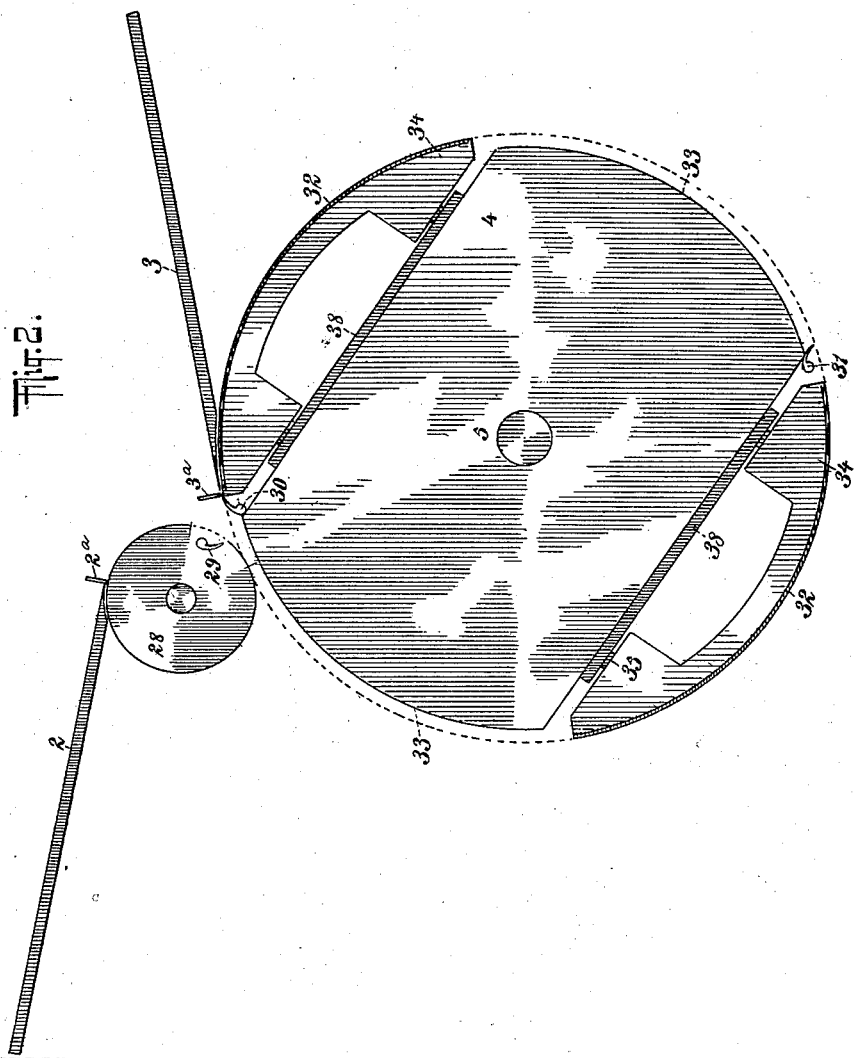
WITNESSES:
INVENTOR
Frank H. Lindner
BY
ATTORNEYS No. 738,821. PATENTED SEPT. 15, 1903.
F. H. LINDNER.
PRINTING PRESS.
APPLICATION FILED FEB. 5, 1902. RENEWED JAN. 22, 1903.

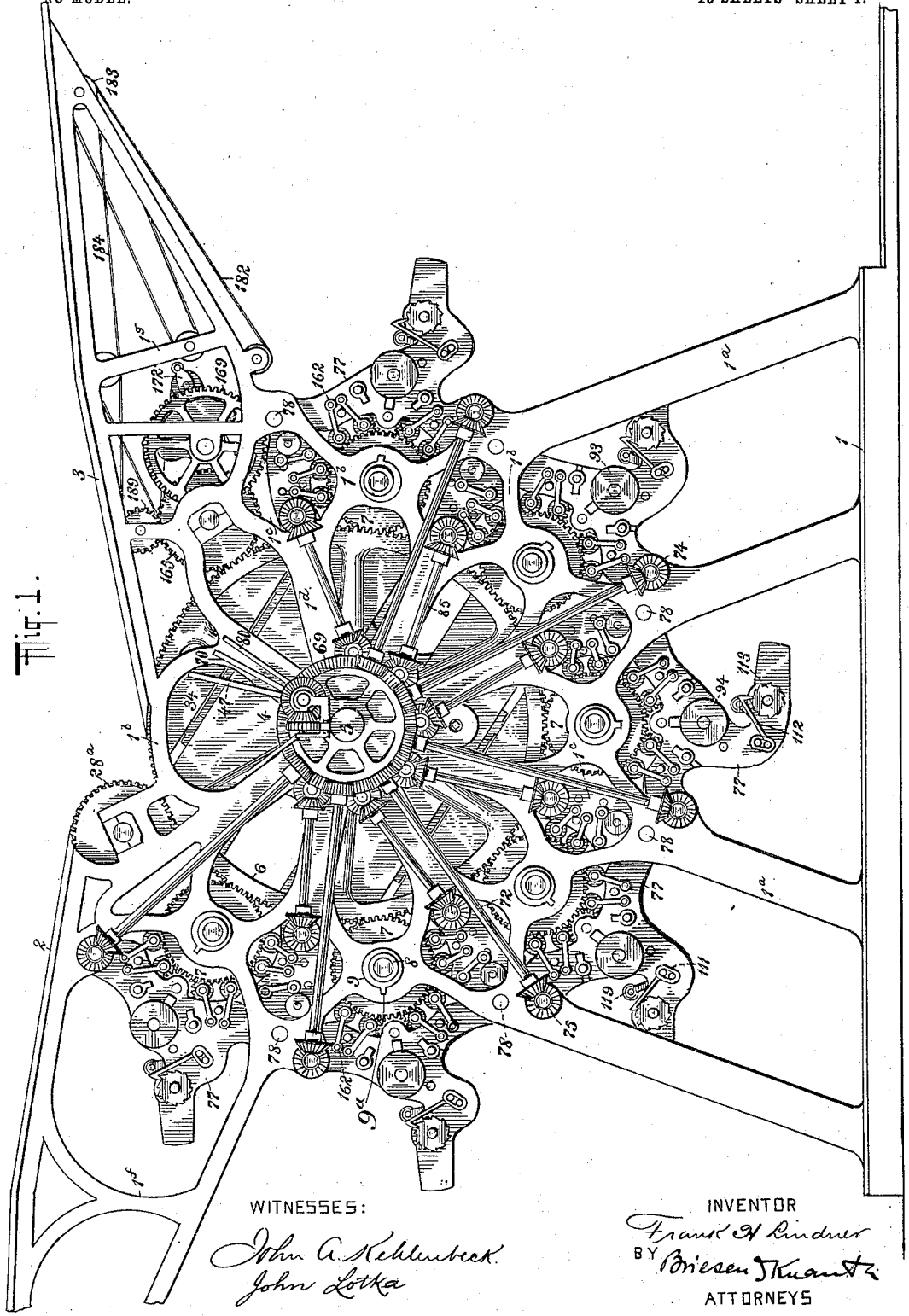

NO MODEL. 13 SHEETS—SHEET 3.

WITNESSES:
INVENTOR
Frank H. Lindner
BY
ATTORNEYS

No. 738,821. PATENTED SEPT. 15, 1903.
F. H. LINDNER.
PRINTING PRESS.
APPLICATION FILED FEB. 5, 1902. RENEWED JAN. 22, 1903.
NO MODEL. 13 SHEETS—SHEET 4.
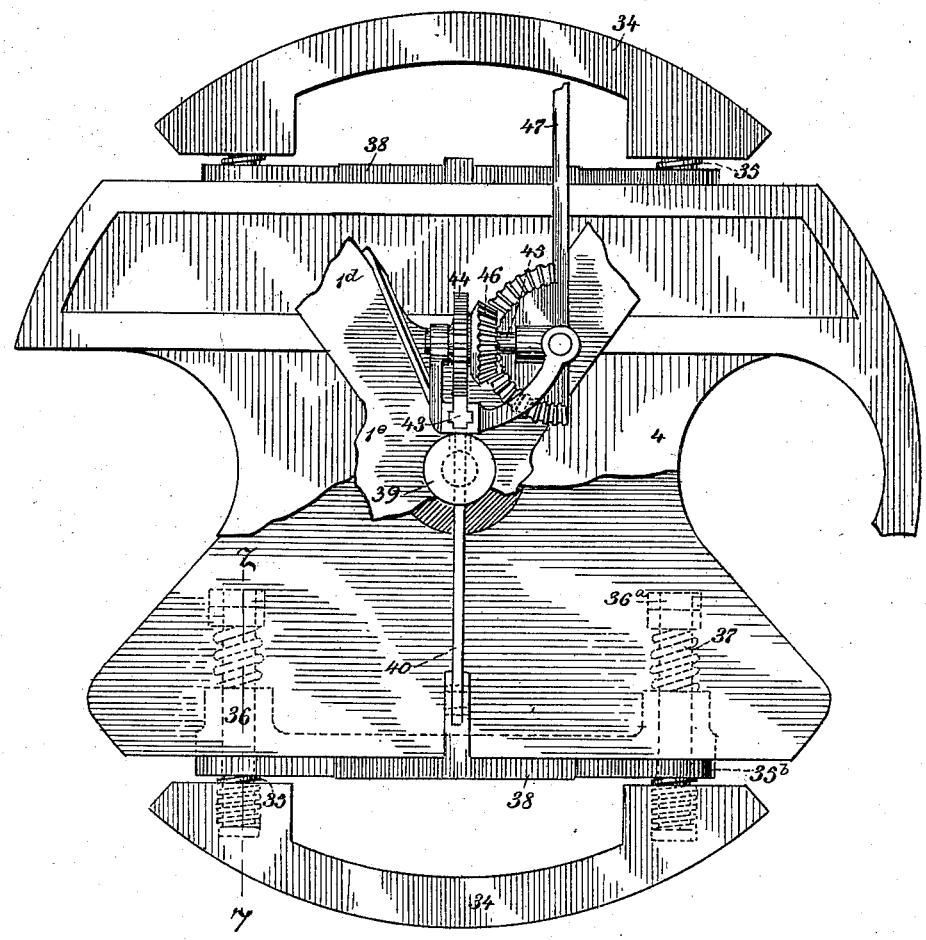
WITNESSES: INVENTOR
Frank H. Lindner
BY
ATTORNEYS

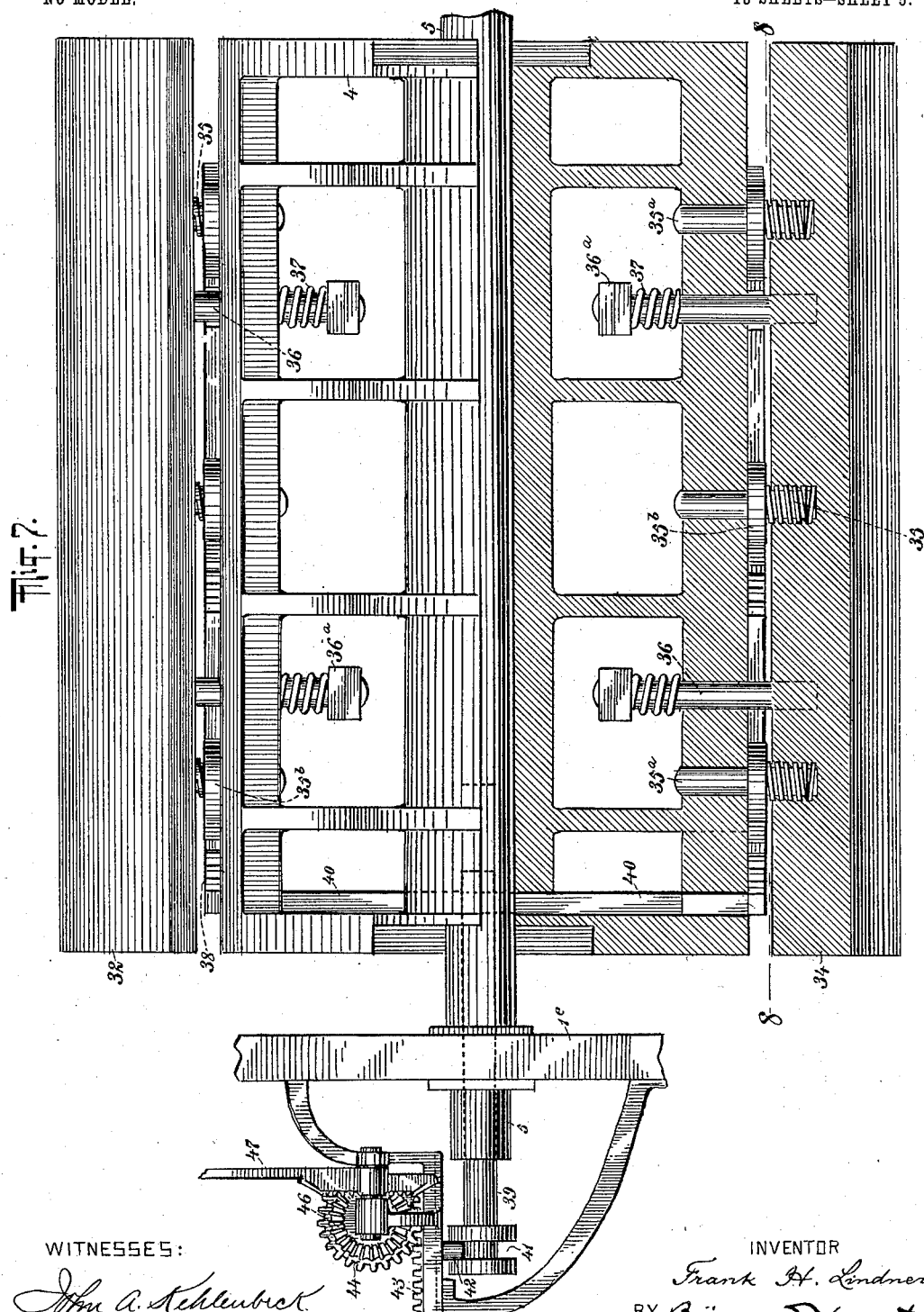

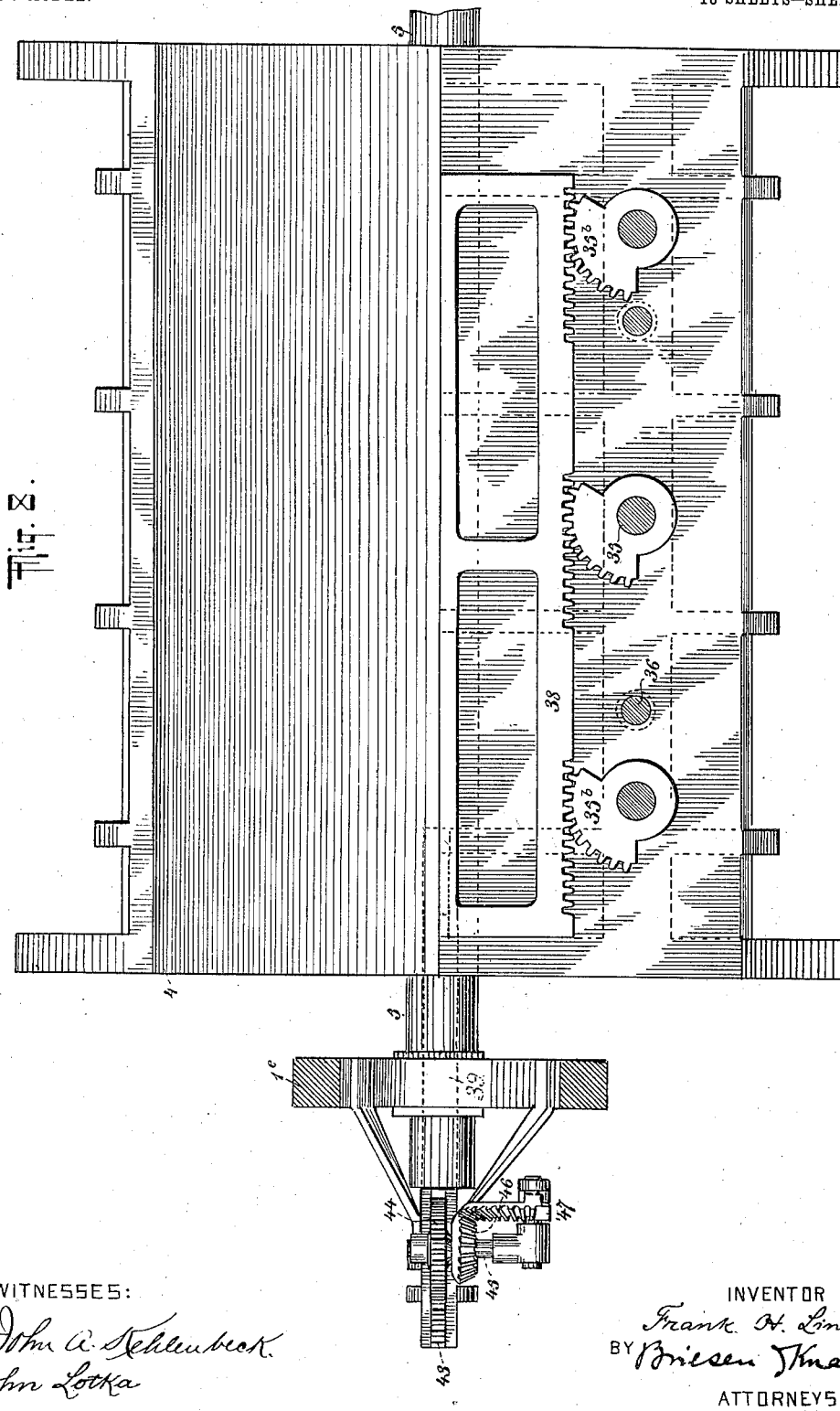

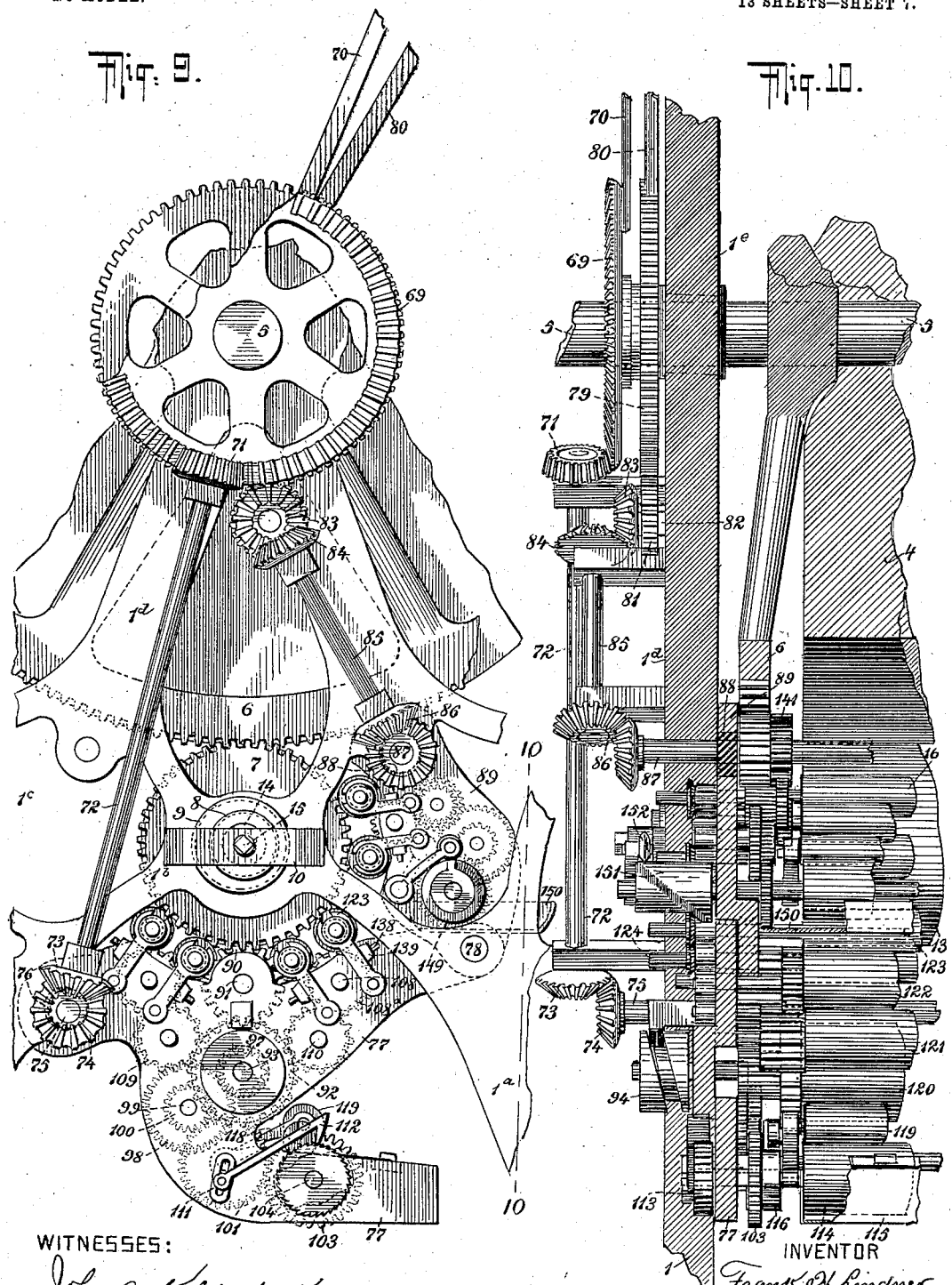

No. 738,821. PATENTED SEPT. 15, 1903.
F. H. LINDNER.
PRINTING PRESS.
APPLICATION FILED FEB. 5, 1902. RENEWED JAN. 22, 1903.
NO MODEL. 13 SHEETS—SHEET 8.
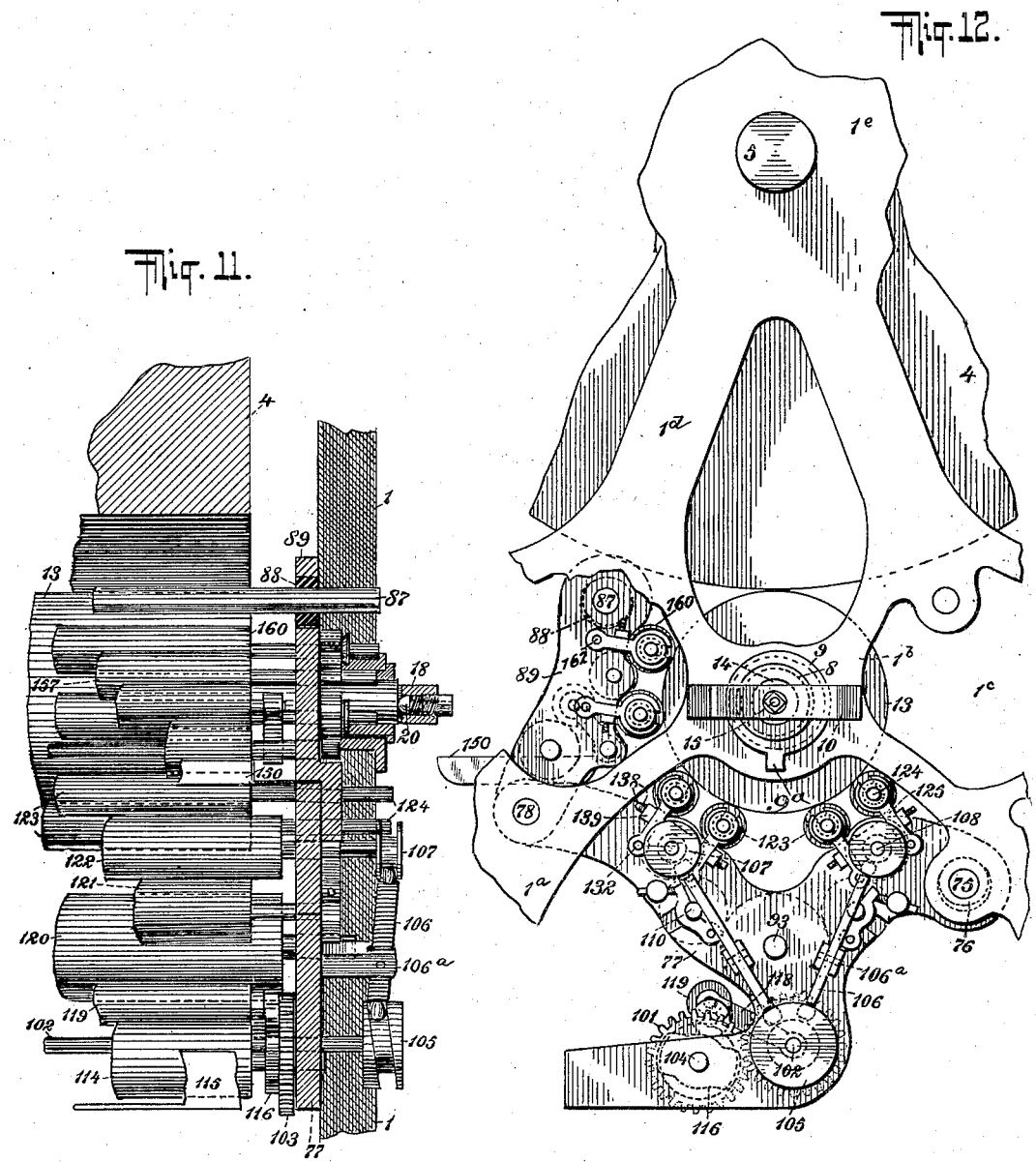
WITNESSES:
John A. Kehlenbeck.
John Lotka
INVENTOR
Frank H. Lindner
BY Briesen & Knauth
ATTORNEYS No. 738,821. PATENTED SEPT. 15, 1903.
F. H. LINDNER.
PRINTING PRESS.
APPLICATION FILED FEB. 5, 1902. RENEWED JAN. 22, 1903.
NO MODEL. 13 SHEETS—SHEET 9.
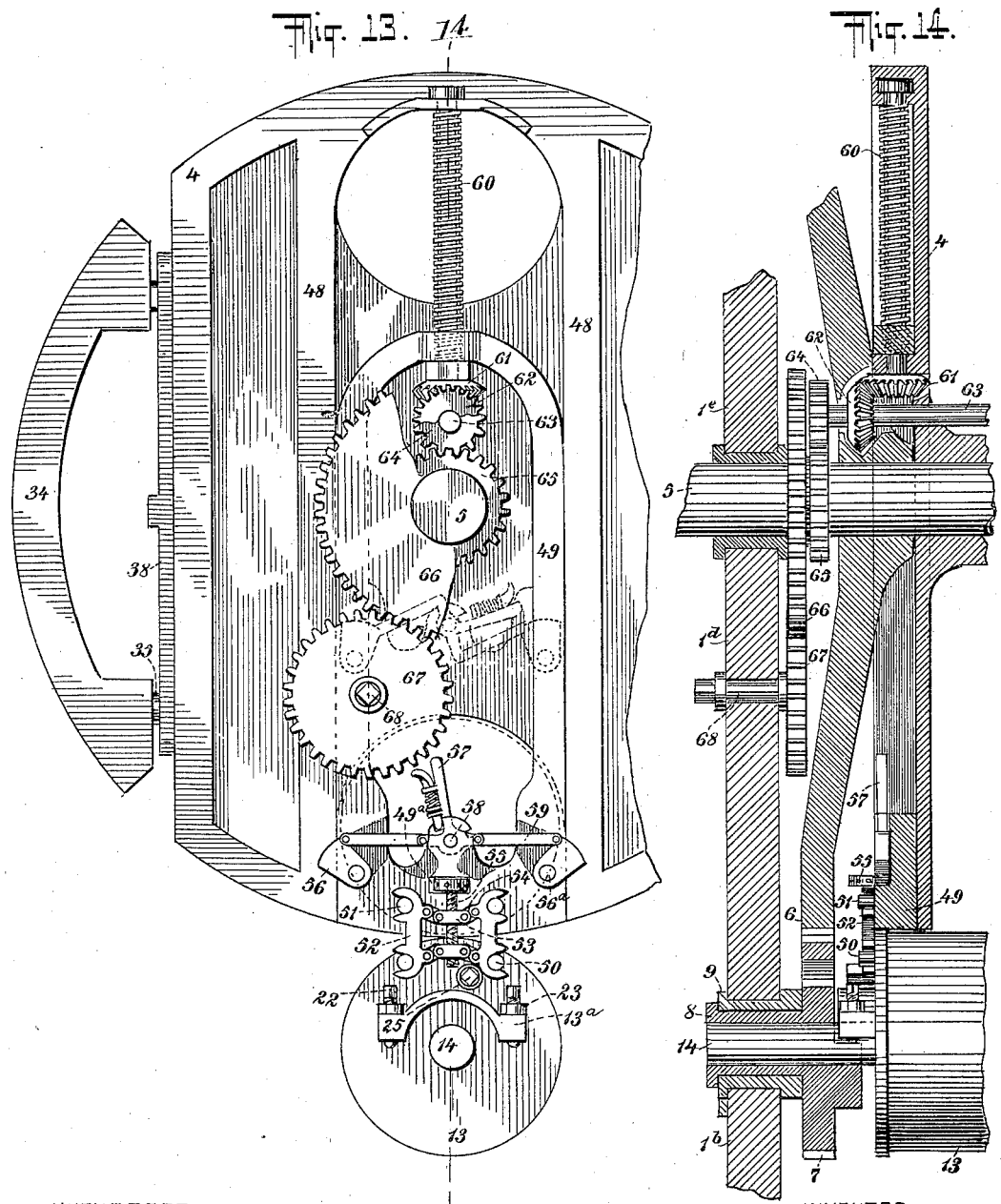
WITNESSES:
John A. Kehlenbeck
John Lotka
INVENTOR
Frank H. Lindner
BY
ATTORNEYS

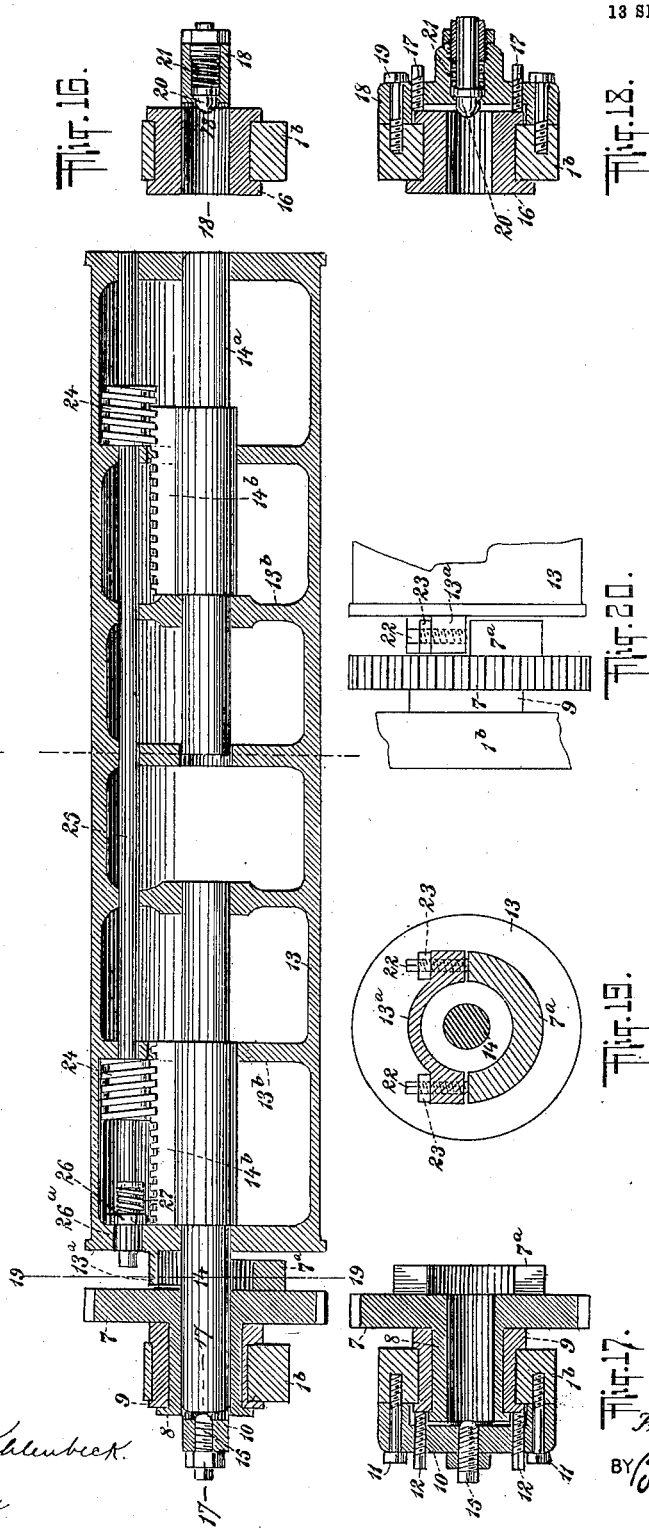

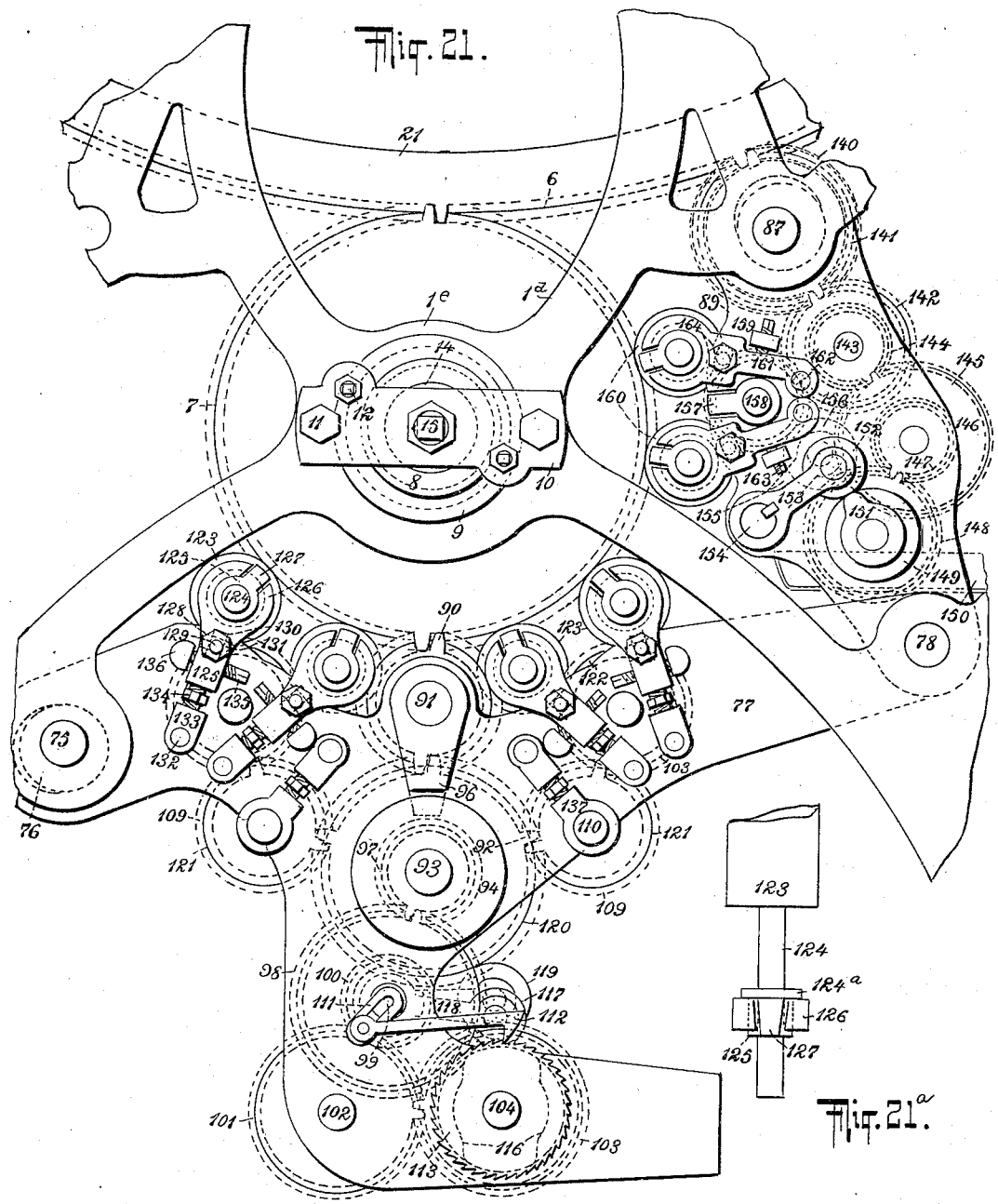

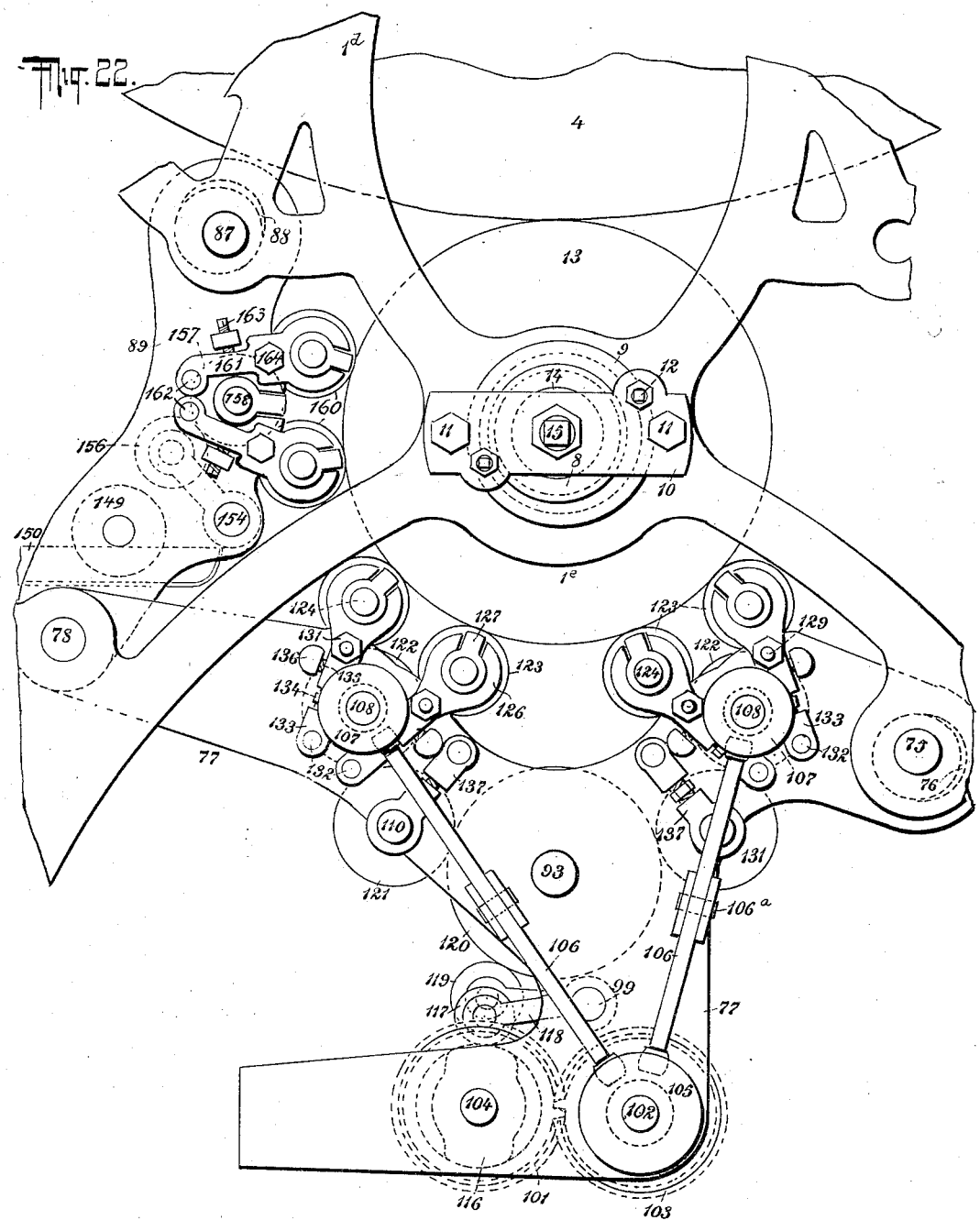

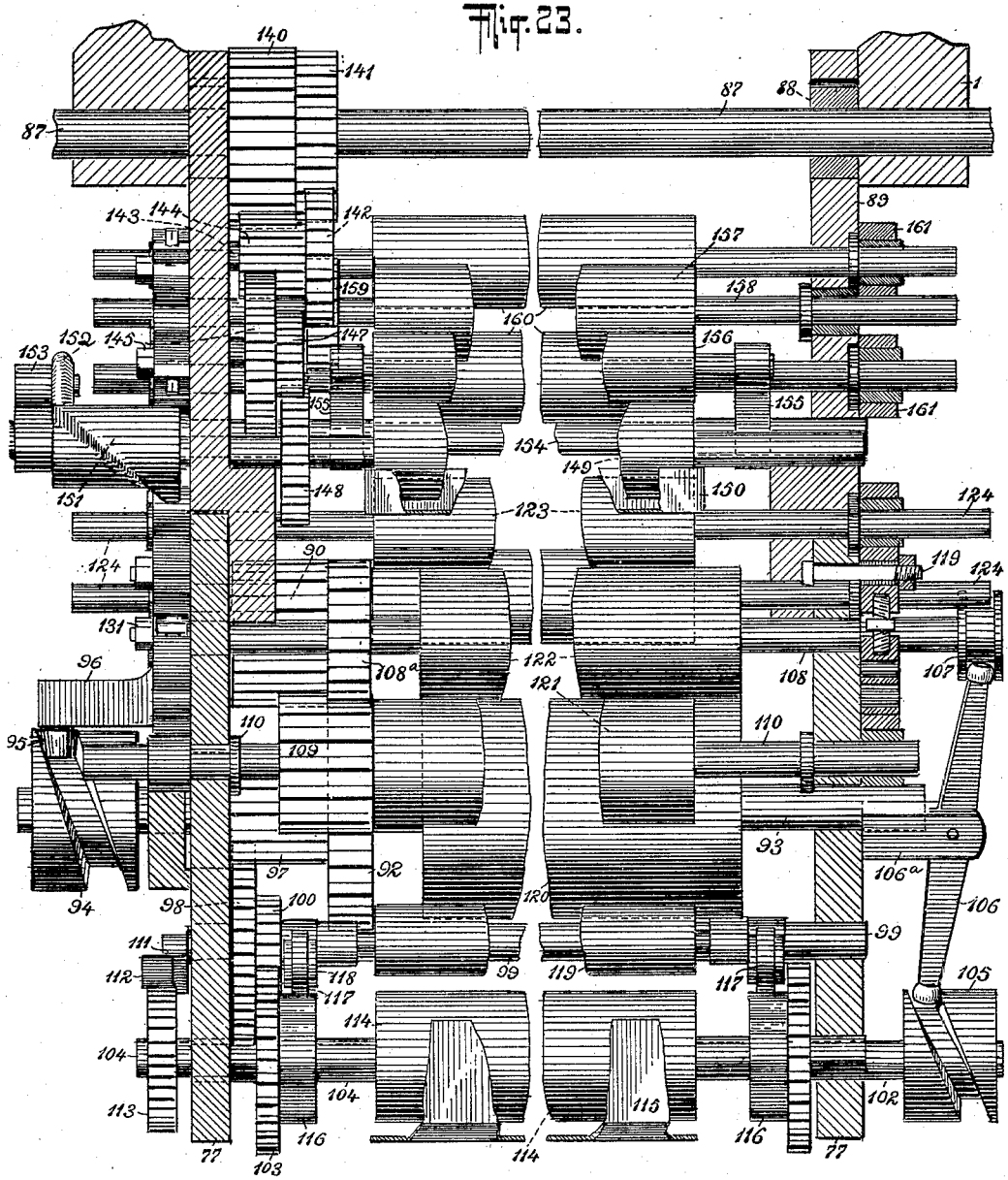

No. 738,821. Patented September 15, 1903.

UNITED STATES PATENT OFFICE.

FRANK H. LINDNER, OF BAYONNE, NEW JERSEY.

PRINTING-PRESS.

SPECIFICATION forming part of Letters Patent No. 738,821, dated September 15, 1903.

Application filed February 5, 1902. Renewed January 22, 1903. Serial No. 140,179. (No model.)

*To all whom it may concern:*

Be it known that I, FRANK H. LINDNER, a citizen of the United States, and a resident of Bayonne, in the county of Hudson and State of New Jersey, have invented certain new and useful Improvements in Printing-Presses, of which the following is a full, clear, and exact description.

My invention relates to printing-presses, and particularly to multicolor-presses.

The object of my present invention is to provide improved mechanism in a multicolor-press which comprises a rotary impression-cylinder having a plurality of impression-surfaces, a plurality of feed devices, a series of form-rollers, an inking and a damping device for each of said rollers, and a delivery mechanism for taking the printed sheets off the impression-cylinder.

The press which forms the subject-matter of my present application comprises improvements in the construction and arrangement of the form-cylinders to allow these cylinders to be adjusted toward and from the impression-cylinder and to permit of bringing the form-cylinders into the recesses of the impression-cylinder for the purpose of facilitating the removal and insertion of the form-cylinders.

My invention also relates to means for adjusting the impression-surfaces of the impression-cylinder to and from an active position without interfering with the driving mechanism of the form-cylinders and their inking mechanism. The press also has means for swinging the damping mechanism and the inking mechanism as an entirety upon a fulcrum, so as to throw the said mechanisms into or out of action, as desired.

I will now proceed to describe in detail the press shown in the accompanying drawings and will then point out the novel features of my present invention in the appended claims.

In the said drawings, Figure 1 is an end view of the press. Fig. 2 is a diagrammatic elevation showing the two feed-boards, the feed-roller, and the impression-cylinder. Fig. 3 is an elevation of the delivery mechanism with one of the feed-boards in section. Fig. 4 is a plan of the mechanism shown in Fig. 3 with the frame in section. Fig. 5 is a general view of the delivery mechanism, together with the delivery-tables. Fig. 6 is an end view of the impression-cylinder, showing the means for moving the impression-surfaces. Fig. 7 is partly a longitudinal section on line 7 7 of Fig. 6 and partly a side view of the impression-cylinder. Fig. 8 is a sectional plan of the impression-cylinder on line 8 8 of Fig. 7. Fig. 9 is a detail end view showing particularly the means for swinging the inking mechanism and the damping mechanism on their fulcrum. Fig. 10 is a section taken on line 10 10 of Fig. 9. Figs. 11 and 12 are views corresponding to Figs. 9 and 10 and showing the same parts as seen from the other end of the press. Fig. 13 shows a portion of the impression-cylinder, together with one of the form-cylinders and the mechanism for carrying said form-cylinder into a cavity of the impression-cylinder. Fig. 14 is a cross-section on line 14 14 of Fig. 13. Fig. 15 is a detail longitudinal section of one of the form-cylinders, showing the mechanism for releasing this form-cylinder from connection with the mechanism which rotates it. Fig. 16 is a detail section of one of the bearings of the form-cylinder. Fig. 17 is a cross-section of the other bearing substantially on line 17 17 of Fig. 15. Fig. 18 is a cross-section on line 18 18 of Fig. 16. Fig. 19 is a sectional elevation on line 19 19 of Fig. 15. Fig. 20 is a side elevation with parts broken away, showing principally the elements represented in Fig. 19. Fig. 21 is an end elevation showing the details of the inking mechanism and of the damping mechanism. Fig. 21$^a$ is a detail plan of a portion of one of the form-rollers with its bearing. Fig. 22 shows the same parts that are illustrated in Fig. 21 as seen from the other end of the press, and Fig. 23 is an elevation of the inking mechanism and the damping mechanism with parts broken away and with the frame shown in section.

The frame of the machine is designated as 1, and this frame I so construct as to make all the parts of the various mechanisms essential to the operation of the press readily accessible. Thus it will be seen that the frame has legs 1$^a$, spaced from each other and converging upwardly, these legs being connected at their upper ends by a web 1$^b$, which is substantially concentric with the axis of the impression-cylinder. This web has at intervals openings 1ᶜ, which allow ready access for the regulation of the damping apparatus. From this web 1ᵇ spaced radial arms 1ᵈ extend to the center of the press, where they connect with the central bearing 1ᵉ. The object of leaving spaces between the said radial arms is to permit ready access to the mechanism for moving the form-cylinders into the impression-cylinder. At its upper end the web 1ᵇ is connected with apertured members 1ᶠ and 1ᵍ, which support the feedboards 2 and 3, respectively, and through the apertures of which access may be had to the inking mechanism of one of the form-cylinders and on the other side to the delivery apparatus.

The impression-cylinder 4 has its shaft 5 journaled in the bearings 1ᵉ, hereinbefore mentioned, and on this shaft is secured the gear 6, which is, however, not directly on the cylinder, but separate therefrom. This gear 6 meshes with gears 7, which drive the form-cylinders, said gears 7 being mounted on sleeves 8, (see Figs. 15 and 17,) which are held against longitudinal movement by bushings 9, secured in any suitable manner to the web 1ᵇ of the frame. The bushings form bearings for the sleeves 8. As shown in Figs. 15 and 17, the frame has a cross-arm 10 secured to it, as by screws 11, and from this cross-arm project screws 12, adapted to engage the bushing 9, so as to hold it against turning after the bushing has been adjusted. As shown in Figs. 1 and 12, the bushing may have a spur 9ᵃ, so that a key may be applied thereto. The arm 10 and screws 11 and 12 are omitted from these views. The bushing 9 has its outer surface eccentric relatively to its bore, (see Figs. 9, 15, 21, and 22,) so that by turning the bushing 9 relatively to the frame the position of the bore of the sleeve 8 will be changed. As this bore receives the shaft or trunnion of the form-cylinder, it will be obvious that an adjustment of the bushing 9 changes the distance between the axis of the form-cylinder and the impression-cylinder. The change, however, is never so great as to bring the teeth of the gears 6 and 7 out of engagement. The form-cylinder 13 has central apertures in its ends, through which are adapted to be projected the trunnions 14. One of said trunnions, which is adapted to extend into the sleeve 8, is held against endwise movement in one direction by engagement with a screw 15 upon the cross-arm 10, and as this screw is adjustable the position of the trunnion may be accurately determined. At the other end a similar trunnion 14ᵃ is adapted to enter a bearing 16, which has an eccentric bore (see Fig. 16) and is capable of adjustment in the frame member 1ᵇ, being held after adjustment by means of screws 17, projecting from a cross-arm 18, which is secured to the frame by means of screws 19. It will be understood that the adjustment of this bearing is exactly similar to that of the bushing 9. The trunnion 14ᵃ is arranged to engage against a pin or head 20, which is held on the cross-bar 18 and is pressed inward by a spring 21, the said pin or head being therefore adapted to yield when engaged by the trunnion 14ᵃ, with the result that there will be a certain contact of one trunnion with the said yielding pin or head and of the other trunnion with the adjustable screw 15. It will be described presently that the trunnions 14 and 14ᵃ may be withdrawn into and projected from the form-cylinder, and in connection with the mechanism employed for this purpose the "spring-pressed end bearing," as I may term the pin 20, accomplishes the further result of compensating for any variation in the operation of the mechanism which projects the trunnions, and, further, this spring-pressed end bearing keeps the form-cylinder pressed toward one side, so as to always secure a perfect register. The driving connection of the form-cylinder with the gear 7 is made through the medium of a segmental rib 7ᵃ on the gear and a similar rib 13ᵃ on the cylinder. The rib 13ᵃ is provided with screws 22 and nuts 23, the ends of the screws abutting against the rib 7ᵃ. This allows the cylinder to be turned slightly with reference to the gear by projecting the screws 22 more or less from the rib 13ᵃ for the purpose of securing an accurate adjustment. This mechanism also permits of readily separating the cylinder from the gear when the cylinder is to be removed into the impression-cylinder, as will be described farther on.

For moving the trunnions 14 and 14ᵃ lengthwise I provide the following mechanism. These trunnions slide in suitable bearings provided on partitions 13ᵇ of the form-cylinder. Upon each of the trunnions is formed a rack 14ᵇ, which is held against turning relatively to the cylinder, for instance, by passing through a guide-slot in one of the partitions 13ᵇ. The racks are engaged by worms 24, secured upon a shaft 25 and having oppositely-disposed threads. This shaft 25 cannot move lengthwise. At one of its ends the shaft has mounted to slide upon it a toothed wheel 26, which, however, is compelled to turn with the shaft and which by means of a spring 27 is pressed outwardly, so that normally it will come into locking engagement with a suitable pin or projection on one end of the cylinder. This toothed wheel has a sleeve 26ᵃ, which fits into the cylinder end and forms a bearing for one end of the shaft, which projecting shaft end is adapted to receive a key or other suitable mechanism for turning the shaft. It will be understood that when this key is introduced the sleeve 26ᵃ will be forced inward against the action of the spring 27, thus bringing the toothed wheel 26 out of contact with the pin which locks it and allowing the shaft 25 to be turned. The rotation of the shaft of course will cause the trunnions 14 and 14ᵃ to be moved either outward or inward. As soon as the key is removed the toothed wheel 26 will again be pressed into locking engagement with the end of the cylinder.

Each of the feed-boards 2 and 3, which are inclined, as shown, is provided at its lower end with a gage 2ª 3ª, respectively. One of the feed-boards, 3, extends tangentially to the impression-cylinder 4, and the other is similarly disposed in relation to a feed-cylinder 28, driven by a gear 28ª, which is in mesh with the master-gear 6. The feed-cylinder is provided with grippers 29 of any approved construction, and the impression-cylinder is shown as carrying two sets of grippers 30 and 31, one of which coöperates with the grippers 29, while the other takes the sheets fed from the board 3. The impression-cylinder is shown as provided with two impression-surfaces 32, which are movable in and out by mechanism to be described presently and between which the surface of the cylinder is depressed, as indicated at 33, so that the form-cylinders will not engage the impression-cylinder except at the impression-surfaces 32. The driving of the impression-cylinder takes place from its shaft 5.

The mechanism for moving the impression-surfaces inward and outward is shown in detail in Figs. 6, 7, and 8. Each of the impression-surfaces 32 is carried by a segment 34, which is connected with the body of the impression-cylinder by means of screws 35 engaging corresponding sockets in the segments 34. These screws are provided with pins 35ª, projecting into apertures of the cylinder-body, and are further provided with toothed sectors 35ᵇ. In order to hold the segments 34 in position in connection with the screws 35, I provide the said segments with rods 36, parallel with the pins 35ª and extending into the cylinder-body. Springs 37, bearing against heads 36ª of the rods 36 and against the inner surface of the impression-cylinder, have a tendency to keep the impression-surfaces carried by the segments 34 as far inward as the screws 35, together with the sectors 35ᵇ, will allow—that is, the sectors 35ᵇ will be kept in engagement with the outer surface of the cylinder-body. To turn the screws 35, I provide a rack or a series of racks 38, movable lengthwise within the impression-cylinder and engaging the sectors 35ᵇ. The shaft 5 is hollow at one end to receive a plunger 39, connected by arms 40 with the racks 38, it being understood that the shaft has two slots for the said arms to pass through and of sufficient length for the requisite movement of the racks. The outer end of the plunger 39 is provided with a groove 41, engaged by a pin 42, which is secured upon a rack 43, movable in a direction parallel with the plunger. This rack is engaged by a spur-wheel 44 upon a shaft 45, driven by means of bevel-gearing 46. One of the bevel-gears is provided with a handle 47. (See also Fig. 1.) By turning this handle the plunger 39 will be moved in or out, and thus the impression-surfaces 32 may be thrown out into the operative position or withdrawn inward into an inactive position.

For taking the form-cylinders into the impression-cylinder and carrying them to a point where they may be readily removed I employ the mechanism shown in Figs. 13 and 14. As shown therein, the impression-cylinder has between the impression-surfaces parallel guideways 48, upon which is mounted to move a slide 49. This slide is adapted to be connected with any one of the form-cylinders by means of any suitable device, such as pins 50 51, located, respectively, on the form-cylinder and on the slide 49, and a locking device, which comprises members 52, provided with seats for the pins 50 51, nuts 53, which are screw-threaded in opposite directions, links 54, which connect the nuts with said members 52 after the fashion of a toggle-joint, and a screw 55, having screw-threads of opposite directions and working in the nuts 53. The slide 49 has a recess 49ª for the head of the screw 55, which may be a capstan-head, so as to allow the screw to be readily turned by means of a peg. When the slide is in its outer position, it is adapted to be locked by means of dogs 56, engaging suitable recesses in the body of the impression-cylinder and pivoted at 56ª to the slide 49. These dogs are worked by a lever 57, which is pivoted at 58, and links 59, connecting said lever with the dogs. The slide 49 has a screw-bearing for a screw 60, which is journaled in the impression-cylinder and arranged radially. This screw is incapable of any lengthwise movement and carries at its inner end a bevel-wheel 61, meshing with a like wheel 62 on a shaft 63, parallel with the axis of the impression-cylinder. At its outer end this shaft carries a pinion 64, rigid with it, said pinion engaging a gear-wheel 65, loose upon the shaft 5 of the impression-cylinder. Rigidly connected with the gear-wheel 65 is another gear-wheel 66, which meshes with a pinion 67 upon a shaft 68, journaled in the frame. The shaft 68 has a squared end or other suitable mechanism for allowing it to be turned.

To remove one of the form-cylinders, I first turn the impression-cylinder until the form-cylinder is in proper relation to the slide 49. Then I connect the slide with the form-cylinder through the medium of the locking device, which engages the pins 50 51, it being understood that there are two such locking devices, as well as two slides, one at each end of the cylinder. Then I turn the shaft 25 to withdraw the trunnions 14 14ª into the form-cylinder 13. Thereupon I unlock the slide 49 from the impression-cylinder and turn the shaft 68, so as to move the slide 49, with the form-cylinder connected therewith, inward. When the form-cylinder has been brought within the periphery of the impression-cylinder, as indicated by dotted lines in Fig. 13, the impression-cylinder is turned to bring the form-cylinder into a position where it is readily accessible—that is, between the feed-roller and the delivery mechanism. Then by turning the shaft 68 in the opposite direction the form-cylinder is carried outward from the impression-cylinder, so that it may be released from connection with the slide 49. The reverse order of operations is of course employed for again placing the form-cylinder in position. The mechanism for tripping the inking mechanism is shown in Figs. 9 to 12. On the shaft 5 is loosely mounted a bevel-wheel 69, provided with a handle 70 and engaging a bevel-pinion 71 upon a shaft 72 journaled in the frame. This shaft carries a bevel-gear 73, meshing with a like wheel 74 on a shaft 75, extending transversely of the frame. This shaft carries upon it an eccentric 76, which engages a socket in the frame 77 of the inking mechanism, which frame is fulcrumed upon the main frame 1 at 78. It will therefore be understood that by operating the handle 70 the frame 77 will be swung on its fulcrum 78, so as to carry the inking-rollers toward or from the surface of the form-cylinder, not far enough, however, to interfere with the driving action of the gearing which forms part of the inking mechanism. Each of the form-cylinders has its own inking mechanism, and the bevel-wheel 69 engages with pinions 71 of each of these mechanisms, as shown in Fig. 1, so that the tripping action will be simultaneous for all the inking mechanisms. A similar mechanism is employed for tripping the damping mechanism. Another wheel 79 is loosely mounted on the shaft 5, this wheel being provided with a handle 80 and meshing with a pinion 81 upon a short shaft or stud 82, projected from the frame 1. With the pinion 81 is mounted to turn a bevel-pinion 83, meshing with a pinion 84 on a shaft 85, journaled in the frame of the machine. Bevel-gearing 86 transmits motion from the shaft 85 to a transverse shaft 87, journaled in the main frame. This shaft carries an eccentric 88, which turns in a socket of the frame 89, which carries the damping mechanism. This frame 89 is pivoted at 78, so that the frame of the inking mechanism and the frame of the damping mechanism swing about the same axis. While this arrangement is very convenient and probably the best for the purposes of my invention, I desire it to be understood that it is not absolutely essential that the frames of both mechanisms should swing on the same pivot.

The inking mechanism is constructed in detail as follows: The gear-wheel 7, by means of which the form-cylinder is rotated, is in driving engagement with a pinion 90 upon a stud 91 on the frame 77. This pinion 90 meshes with a gear-wheel 92 upon a shaft 93. Upon this shaft is mounted at one end a cam 94, having a groove of such shape as to give the shaft 93 a longitudinal reciprocating motion in its bearings by the coöperation with said groove of a pin or roller 95 on a bracket 96, which projects from the frame 77. Upon the shaft 93 is rigidly secured a gear-wheel 97, which meshes with a gear-wheel 98, fast upon a shaft 99. On the shaft 99 is also rigidly secured a pinion 100, which is in driving engagement with a gear-wheel 101 upon a shaft 102. This gear-wheel 101 engages a gear-wheel 103, loose upon a shaft 104. The shaft 102 is provided at one end with a head 105, provided with a cam-groove adapted to impart a rocking motion to a lever 106, fulcrumed upon a bracket 106$^a$. The upper end of the lever 106 engages a grooved collar 107 upon a shaft 108, which is capable of turning and of reciprocating in its bearings. On this shaft is rigidly secured a gear-wheel 108$^a$, which engages a gear-wheel 109 on a shaft 110, which is held against lengthwise movement. The gear-wheel 109 is also in engagement with the gear-wheel 92 before mentioned. It will be understood that by the mechanism just described the shafts 108 and 93 will receive a reciprocating motion lengthwise of their axes in addition to their rotary motion, while the other shafts will simply turn. On the shaft 99 is rigidly secured an arm 111, pivotally connected with a pawl or hook 112, and preferably the connection is an adjustable one, so that the throw of the pawl may be altered. This pawl is in engagement with a ratchet-wheel 113, which is rigidly fixed to the shaft 104. Thus an intermittent motion is imparted to the shaft 104 and to the fountain-roller 114 carried thereby. 115 indicates the fountain into which said roller dips. Rigidly connected with the gear-wheel 103 is a cam 116, on which rides a roller 117, which is mounted in arms 118. The arms 118 carry a roller 119, which transfers the ink from the fountain-roller 114 to the reciprocating distributing-roller 120, which is rigid upon the shaft 93. This distributing-roller engages two rollers 121 on the shafts 110. On the shafts 108 are mounted the vibrating distributing-rollers 122, which engage the said rollers 121 and which also engage the form-rollers 123, of which four are shown for each inking mechanism. Each form-roller 123 has a shaft 124, mounted to turn in a bearing 125, which fits into a socket 126 upon the frame 77. This socket has a slot which narrows outwardly, and into said slot is adapted to project a wedge-shaped projection 127 on the bearing 125. The width of this projection is such that it may pass freely through the slot of the socket when the bearing is moved outward. The central portion or hub of the bearing is wider than the slot, so that those form-rollers which are at the upper portion of the machine cannot fall out of their sockets in case the respective form-cylinders are removed. It will be understood that the bearings 125 are free to slide on the shafts of the form-rollers 123, and when the parts are in the position shown in Fig. 21$^a$ a rotation of said shaft in either direction will cause the wedge-surfaces of the socket and the bearing to engage each other and will thus exert an inward pressure on the bearing, forcing it against a collar 124ª on the shaft 124. The diameter of the shaft 124 is slightly less than the opening in the socket 126, so that after sliding the bearing 125 outwardly the shaft may be lifted out of the socket. Each socket 126 is adjusted by the following mechanism: The socket has a longitudinal slot 128, which loosely receives a screw 129, this screw being also loose within a slot 130, arranged in the frame 77 and extending crosswise of the slot 128. A nut 131 serves for holding the socket in its adjusted position. The socket 125 is fulcrumed upon the frame 77 at 132 and is constructed in two sections, of which the pivot-section 133 is connected with the other socket-section by means of a screw 134, having two threads of opposite pitch. By means of this screw the socket-section can be adjusted toward and from the pivot-section, so as to bring the form-roller nearer to or farther from the impression-cylinder. By means of a screw 135 extending through the socket-section 125 and abutting against a stop 136 the entire socket may be swung on its fulcrum 132, the pin or screw 129 working in the segmental transverse slot 130 in this case. Thus a double adjustment of the form-roller is obtained, and the variations of its position can be effected very accurately. A similar adjustment toward and from the pivot is shown for the arms or sockets 137, which carry the bearings for the distributing-rollers 121.

In Figs. 9 and 12 the adjustment of the form-rollers toward and from the pivots 132 is not illustrated and the mechanism for swinging the sockets on their pivots consists of a screw 138, extending through a projection 139 on the frame 77 into engagement with the socket 125. These figures also show a slight modification in the driving of the ratchet-wheel 113 and in the location of the arms 118. The driving mechanism of the ratchet-wheel, as well as the said arms 118, are in this case mounted on the shaft 102 instead of being on the shaft 99.

The press, as shown, has its parts so dimensioned that each form-cylinder makes four complete revolutions for each revolution of the impression-cylinder, one revolution of the form-cylinder corresponding to an impression period, while during the next revolution the form-cylinder is out of contact with the impression-cylinder. With the arrangement shown in Figs. 9 to 12 the transferring-roller 119 carries ink from the fountain-roller to the distributing-rollers only once for every two revolutions of the form-cylinder, while in the construction shown in Figs. 21 to 23 the ink-supply to the distributing-rollers takes place at every revolution of the form-cylinder.

The damping mechanism, which is carried by the frame 89, pivoted at 78, as before described, is driven by means of the master-gear 6, which also drives the form-cylinders. This master-gear 6 meshes with a pinion 140, which is loose upon the shaft 87. On this shaft is also mounted loosely, but rigid with the pinion 140, another pinion 141, which meshes with a gear-wheel 142 on a stud 143. Rigid with the gear-wheel 142 is a pinion 144, which drives a gear-wheel 145 on a stud 146. With the gear-wheel 145 is rigid a pinion 147, which drives, through the medium of a gear-wheel 148, the fountain-roller 149. This roller dips into a fountain or trough 150 containing water. On the shaft of the roller 150 is located a cam 151, the shape of which will be seen best in Fig. 23. This cam is narrow at its outer end and widens gradually toward the frame of the machine, so that according to the portion of the cam which is operative the cam will act during a smaller or greater portion of the revolution of the fountain-roller 149. The cam 151 engages a roller 152, mounted upon an arm 153, which swings with a shaft 154. This arm is further capable of sliding on said shaft and may consequently be adjusted so as to bring the roller 152 into engagement with any portion of the cam 151. It will be understood that by this means the arm 153 will be kept in a raised position for a greater or shorter period during each revolution of the fountain-roller 150. The shaft 154 also carries arms 155, in which is journaled the tranferring-roller 156, adapted to engage the distributing-roller 157, journaled at 158 and driven from the gear-wheel 142 by means of a toothed wheel 159. This distributing-roller engages the damping-rollers 160, which are journaled in socket-arms 161, fulcrumed at 162. These arms may be adjusted by swinging them on their fulcrums through the medium of screws 163 and may then be held stationary by nuts 164. The bearing portion of the sockets is constructed exactly as described for the form-rollers with reference to Fig. 21ª. It will be understood that when the frame 89 is rocked on its fulcrum 78 by means of the eccentric 88 the position of the gear-wheel 142 with respect to the gear-wheel 141 will change slightly, but not enough to interfere with the proper mesh of these wheels.

The delivery mechanism (shown in detail in Figs. 3, 4, and 5) is constructed as follows: The master-gear 6 drives a toothed wheel 165 on the shaft 166 of the delivery-cylinder 167. On this shaft is also secured a pinion 168, which drives a gear-wheel 169, journaled upon the frame of the press. On the shaft of the wheel 169 is secured a cam 170, upon which travels a roller 171, secured to an arm 172, loosely mounted on the shaft 166. This arm further carries a rod 173, on which are mounted sheaves 174, driven from the cylinder 167 by means of fly-cords 175. Another rod 176 is also carried by the arm 174 and is provided with spur-wheels 177, preferably located between the planes of the sheaves 174. The arrangement of the cam 170 and arm 172 is duplicated at each side of the delivery-cylinder. It will be understood that the cams 170 will cause the arms 172 to swing up and down on the shaft 166 and will allow the sheaves 174 to be driven continuously. The two extreme positions of the sheaves 174 are indicated by dotted lines in Fig. 3, and in these positions the sheaves are in proper relation to deliver the sheets to fly-cords 178 and 179, respectively, which lead to delivery-tables 180, having fly-sticks 181. Motion is imparted to the fly-cords 178 and 179 by means of cords or belts 182, leading from a pulley 183, which is driven by means of cords 184 185, and an intermediate pulley 186 from a drive-pulley 187 on a stud 188. This drive-pulley is actuated by means of a pinion 189, meshing with the gear 165. Guide-rollers 190 are arranged adjacent to the point at which the fly-cords 175 leave the delivery-cylinder. The length of the fly-cords 178 and 179 is so proportioned and the swinging of the frame constituted by the arms 172 and the rods 175 176 is so timed that the fly-sticks 181 will swing down simultaneously, thus avoiding all danger of blowing away the sheet from one set of fly-sticks by the draft due to the swinging down of a sheet with the other set of fly-sticks.

I claim as my invention and desire to secure by Letters Patent—

1. In a printing-press, the combination with a rotary impression-cylinder, of two feed devices for supplying the sheets to said cylinder alternately, means for effecting the impression, a single delivery-cylinder for taking all the sheets off the impression-cylinder, two conveying mechanisms for the printed sheets, and a movable distributing device for directing the sheets from the delivery-cylinder alternately to said conveying mechanisms.

2. In a printing-press, the combination with a rotary impression-cylinder, of a plurality of feed devices for supplying the sheets to said cylinder successively, means for effecting the impression, a single delivery-cylinder for taking off from the impression-cylinder, sheets supplied by a plurality of feed devices, a plurality of conveying mechanisms for the printed sheets, a movable distributing device for directing the sheets from the delivery-cylinder to said conveying mechanisms successively, and means timed in accordance with the take-off action of the delivery-cylinder, for shifting said distributing devices from one conveying mechanism to another.

3. In a printing-press, the combination with a rotary impression-cylinder, of a plurality of feed devices for supplying the sheets to said cylinder successively, means for effecting the impression, a single delivery-cylinder for taking off from said impression-cylinder, all the sheets supplied by the said feed devices, in regular sequence, a plurality of conveying mechanisms equal in number to the feed devices, a movable distributing device for directing the printed sheets from the delivery-cylinder to said conveying mechanisms, and means for shifting said distributing device from one conveying mechanism to another at such times that each conveying mechanism will receive only sheets supplied by one of the feed devices.

4. In a printing-press, the combination with a rotary impression-cylinder, of a plurality of feed devices for supplying sheets to said cylinder successively, means for effecting the impression, a single delivery device for taking off from the impression-cylinder, sheets supplied by a plurality of feed devices, a plurality of conveying mechanisms for the printed sheets, a movable distributing device interposed between said conveying mechanisms and the delivery device, and means for automatically shifting said distributing device so as to cause it to direct the printed sheets from the delivery device in regular sequence to the said conveying mechanisms.

5. In a printing-press, the combination with a rotary impression-cylinder, of a plurality of feed devices for supplying sheets to said cylinder successively, means for effecting the impression, a single delivery device for taking off from the impression-cylinder, sheets supplied by a plurality of feed devices, a plurality of conveying mechanisms for the printed sheets, a movable distributing device interposed between said conveying mechanisms and the delivery device, and means for shifting said distributing device so as to cause it to direct the printed sheets from the delivery device to one or the other of said conveying mechanisms.

6. In a printing-press, the combination with a rotary impression-cylinder, a series of form-cylinders, a feed device, a delivery device, an inking and a damping device for each form-cylinder, a master-gear rotating with the impression-cylinder, gears meshing with said master-gear and mounted to turn coaxially with the form-cylinders to actuate the same, a driving connection from each of said last-named gears to the corresponding inking device, and additional gears likewise meshing with the master-gear and actuating respectively the feed device, the delivery device, and the damping devices.

7. In a printing-press, the combination with a rotary impression-cylinder having a recessed portion, a series of form-cylinders arranged around the impression-cylinder, means for withdrawing the form-cylinders into the recess of the impression-cylinder, gears arranged to drive the form-cylinders when they are in their operative position, and a master-gear engaging the form-cylinder gears, said master-gear being held to rotate with the impression-cylinder and being independent of the means for withdrawing the form-cylinders into the impression-cylinder, so that the continuity of the driving action of the impression-cylinder is preserved when one or more of the form-cylinders are removed from their normal positions.

8. In a printing-press, the combination with a rotary impression-cylinder having a recess, a master-gear rigidly connected with the impression-cylinder and located at one side of said recess, driving-gears meshing with said master-gear, form-cylinders arranged to be driven by said gears, and means for disconnecting said form-cylinders from their driving-gears to allow them to be transferred to the recess of the form-cylinder.

9. In a printing-press, the combination with a rotary impression-cylinder having a recess, a master-gear rigidly connected with the impression-cylinder and located at one side of said recess, driving-gears meshing with said master-gear, form-cylinders arranged to be driven by said gears, means for disconnecting said form-cylinders from their driving-gears to allow them to be transferred to the recess of the impression-cylinder, and inking devices in operative connection with said driving-gears.

10. In a printing-press, a frame comprising central bearings, an impression-cylinder journaled in said bearings, frame-arms radiating from said bearings, a web connecting said arms at a greater distance from the said bearings than the periphery of the impression-cylinder, form-cylinders arranged to coöperate with the impression-cylinder and journaled in said web, a slide or carrier movable radially of the impression-cylinder, means for disconnecting the form-cylinders from their bearings, devices for connecting a form-cylinder with the slide of the impression-cylinder at those portions which are exposed in the opening between the web and two of said radial frame-arms, and means for operating the slide and the form-cylinders.

11. In a printing-press, a frame comprising central bearings, an impression-cylinder journaled in said bearings, frame-arms radiating from said bearings, a web connecting said arms at a greater distance from the said bearings than the periphery of the impression-cylinder, form-cylinders arranged to coöperate with the impression-cylinder and journaled in said web, a slide or carrier movable radially of the impression-cylinder, means for disconnecting the form-cylinders from their bearings, devices for connecting a form-cylinder with the slide of the impression-cylinder at those portions which are exposed in the opening between the web and two of said radial frame-arms, means for operating the slide and the form-cylinders, the said web having apertures at intervals, damping mechanism coöperating with the form-cylinders and exposed through the apertures of the web, spaced frame-legs connected with the web, and inking mechanism coöperating with the form-cylinders and exposed through the open spaces at the sides of and between the frame-legs.

12. In a printing-press, a frame comprising central bearings, an impression-cylinder journaled in said bearings, frame-arms radiating from said bearings, a web connecting said arms at a greater distance from the said bearings than the periphery of the impression-cylinder, form-cylinders arranged to coöperate with the impression-cylinder and journaled in said web, a slide or carrier movable radially of the impression-cylinder, means for disconnecting the form-cylinders from their bearings, devices for connecting a form-cylinder with the slide of the impression-cylinder at those portions which are exposed in the opening between the web and two of said radial frame-arms, an inking mechanism for each form-cylinder, the said web having apertures between the form-cylinder bearings, and having apertured extensions at its upper end, a feed-board and a feed-cylinder supported by one extension, the inking mechanism of one of the form-cylinders being exposed through the aperture of this extension, a delivery device and another feed-board carried by the other extension, said delivery device being exposed through the aperture of the extension carrying it, damping mechanism coöperating with the form-cylinders and exposed through the aperatures of the web, and spaced frame-legs connected with the lower portion of the web, sundry of the inking mechanisms being exposed through the open spaces at the sides of and between the frame-legs.

13. In a printing-press, a frame comprising central bearings, an impression-cylinder journaled in said bearings, a web connected with said bearings, form-cylinders journaled in said web, an inking mechanism for each form-cylinder, the said web being provided with apertured extensions at its upper end, a feed-board and a feed-cylinder supported by one extension, the inking mechanism of one of the form-cylinders being exposed through the aperture of this extension, a delivery device and another feed-board carried by the other extension, said delivery device being exposed through the aperture of the last-named extension.

14. In a printing-press, the combination, with an impression-cylinder having a plurality of impression-surfaces, and form-cylinders arranged to operate in conjunction with said impression-surfaces, of two feed-boards located above the press and adapted to deliver sheets alternately in opposite directions, one of said feed-boards being arranged to feed the sheets directly to the impression-cylinder, and a feed-cylinder adapted to take the sheets from the other feed-board directly above it and deliver them to every other impression-surface.

15. In a printing-press, the combination, with an impression-cylinder having a plurality of impression-surfaces, and form-cylinders arranged to operate in conjunction with said impression-surfaces, of a feed-cylinder adapted to feed a sheet to every alternate impression-surface upon the said impression-cylinder, and two feed-boards, located above the press and adapted to feed sheets alternately, one of said feed-boards being arranged to feed the sheets directly to the impression-cylinder, while the said feed-cylinder is adapted to take the sheets from the other feed-board and deliver them to the impression-cylinder.

16. In a printing-press, the combination, with an impression-cylinder having a plurality of impression-surfaces, and two feed-boards arranged to supply the sheets alternately to said impression-surfaces, of a plurality of form-cylinders arranged at the periphery of the impression-cylinder, a separable connection between each form-cylinder and its bearings, so that the form-cylinder may be freed from its bearings, and means for withdrawing a form-cylinder, when free, inwardly into the impression-cylinder and thus permitting the form-cylinder to be carried around by the impression-cylinder to a position where it may be readily removed therefrom.

17. In a printing-press, the combination, with an impression-cylinder having a plurality of impression-surfaces, and two feed-boards adapted to supply the sheets alternately to said impression-surfaces, of a plurality of form-cylinders arranged at the periphery of the impression-cylinder, driving mechanism for said form-cylinders, means for disconnecting each form-cylinder from the driving mechanism and from its support or bearings, and means for withdrawing a form-cylinder, when free, inwardly into the impression-cylinder and thus permitting such form-cylinder to be carried around by the impression-cylinder to a position where it may be readily removed therefrom.

18. In a printing-press, the combination with a rotary impression-cylinder having a recess, a series of form-cylinders arranged around said impression-cylinder and adapted to enter the recess thereof, a slide mounted to move radially upon the impression-cylinder and arranged to carry a form-cylinder to and from its bearings, means for operating the slide, and a device for producing a locking engagement of the impression-cylinder with the slide in the outer position of the latter.

19. In a printing-press, the combination with a rotary impression-cylinder having a recess, a series of form-cylinders arranged around said impression-cylinder and adapted to enter the recess thereof, a slide mounted to move radially upon the impression-cylinder and arranged to carry a form-cylinder to and from its bearings, means for operating the slide, and a locking device carried by the slide to hold it immovable in relation to the impression-cylinder.

20. In a printing-press, the combination with a rotary impression-cylinder having a recess, a series of form-cylinders arranged around said impression-cylinder and adapted to enter the recess thereof, a slide mounted to move radially upon the impression-cylinder and arranged to carry a form-cylinder to and from its bearings, a screw disposed radially of the impression-cylinder and mounted to turn thereon without longitudinal movement, said screw engaging a threaded portion of the slide, and means for turning said screw.

21. In a printing-press, the combination with a rotary impression-cylinder having a recess, a series of form-cylinders arranged around said impression-cylinder and adapted to enter the recess thereof, a slide mounted to move radially upon the impression-cylinder and arranged to carry a form-cylinder to and from its bearings, a screw disposed radially of the impression-cylinder and mounted to turn thereon but held against longitudinal movement, said screw engaging a threaded portion of the slide, an operating member mounted to turn centrally of the impression-cylinder, but stationary during the rotation of the cylinder, and a driving connection from said member to said screw.

FRANK H. LINDNER.

Witnesses:
 JOHN LOTKA,
 OTTO V. SCHENK.